T. J. Thurston,
Coal Hod & Screen.
No. 81,037.       Patented Aug. 11, 1868.
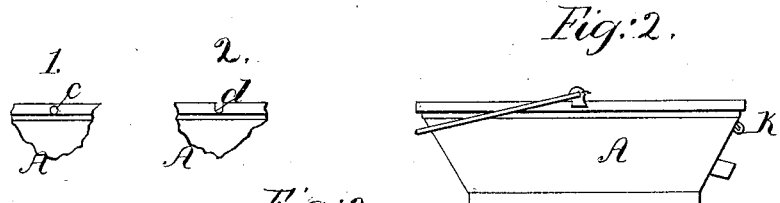
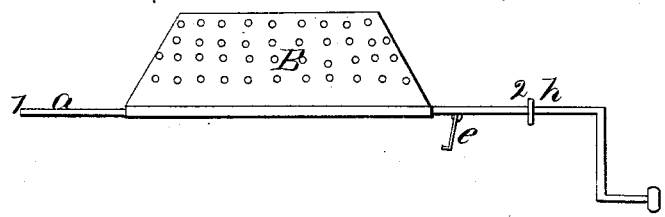
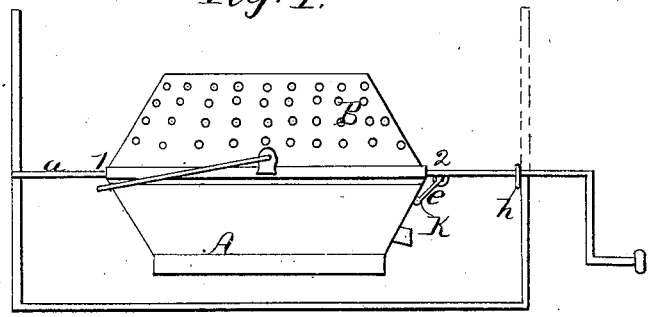
Witnesses:
Henry C. Houston
M. Frank Seavey
Inventor:
T. J. Thurston
Per. William Henry Clifford Atty

United States Patent Office.

THOMAS J. THURSTON, OF LEWISTON, MAINE.

Letters Patent No. 81,037, dated August 11, 1868.

IMPROVED ASH-SCREEN AND COAL-HOD COMBINED.

The Schedule referred to in these Letters Patent and making part of the same.

TO ALL WHOM IT MAY CONCERN:

Be it known that I, THOMAS J. THURSTON, of Lewiston, in the county of Androscoggin, and State of Maine, have invented a new and useful Improved Rotary Coal-Hod and Sifter; and I hereby declare the following to be a full, clear, and exact description thereof, which will enable others to make and use my invention, reference being had to the accompanying drawings, forming part of this specification, in which—

Figure 1 is a side view of sifter and hod set for use.

Figure 2 a side view of hod separate.

Figure 3 a side view of sifter.

I and II are views of the hole and slot in the edge of the hod, for the insertion of the rod $a$.

I am aware of Letters Patent to Amos Porter, February 25, 1868, No. 74,770, for a rotating hod and sifter, and I desire to disclaim an ash-pan made of two parts, so made that when one-half fits into the other, the holes shall not match, but will close each other up. Neither do I claim the rotating frame into which the hod and sifter are placed when to be rotated.

My invention is different from this, in having no frame, but a shaft, rigidly attached to the sifter, and also in having the hod and sifter united by means of the shaft entering the hole in the hod at one end, and being hooked down at the other.

My invention is of simpler construction than that above referred to.

A is the hod, of common construction.

B, the sifter, perforated, as shown, and having rigidly attached to it the crank-shaft $a$.

The two parts are united by the sifter fitting down into the hod, by a lip or shoulder, and by the shaft $a$, entering at its end, 1, into the hole $c$, and resting at 2 in the slot $d$, and being hooked down by the hook $e$, and a staple, $k$, on the hod.

The whole can then be rotated, as seen in fig. 1, and the ashes separated from the coal, the coal remaining in the hod.

$h$ is a shoulder on the shaft $a$, to keep the shaft in position in the box or other receptacle in which the device is operated.

A wire net-work can be employed, instead of the sifter B, shown in fig. 3.

Disclaiming previous patents—

What I claim as my invention, and desire to secure by Letters Patent, is—

The combination, with the hod A, having the hole $c$, slot $d$, and staple $k$, of the sifter B, having the crank-shaft $a$, the combination to operate as herein set forth, and for the purposes described.

THOS. J. THURSTON.

Witnesses:
WILLIAM HENRY CLIFFORD,
WM. FRANK SEAVEY.